US012768505B2

(12) United States Patent
Van Bommel et al.

(10) Patent No.: US 12,768,505 B2
(45) Date of Patent: Oct. 20, 2026

(54) LED FILAMENT

(71) Applicant: SIGNIFY HOLDING B.V., Eindhoven (NL)

(72) Inventors: Ties Van Bommel, Horst (NL); Robert Jacob Pet, Waalre (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/840,968

(22) PCT Filed: Feb. 16, 2023

(86) PCT No.: PCT/EP2023/053864
§ 371 (c)(1),
(2) Date: Aug. 23, 2024

(87) PCT Pub. No.: WO2023/161114
PCT Pub. Date: Aug. 31, 2023

(65) Prior Publication Data

US 2025/0189087 A1 Jun. 12, 2025

(30) Foreign Application Priority Data

Feb. 24, 2022 (EP) .................................... 22158407

(51) Int. Cl.
*F21K 9/232* (2016.01)
*F21Y 107/30* (2016.01)
*F21Y 115/10* (2016.01)

(52) U.S. Cl.
CPC ........... *F21K 9/232* (2016.08); *F21Y 2107/30* (2016.08); *F21Y 2115/10* (2016.08)

(58) Field of Classification Search
CPC ... F21K 9/232; F21Y 2107/30; F21Y 2115/10
See application file for complete search history.

(56) References Cited

U.S. PATENT DOCUMENTS

| | | | | |
|---|---|---|---|---|
| 5,270,609 | A * | 12/1993 | Smith | H01K 1/18 313/271 |
| 10,690,292 | B1 * | 6/2020 | Cao | F21K 9/238 |
| 11,047,532 | B1 * | 6/2021 | Chen | F21S 4/24 |
| 2015/0131306 | A1 * | 5/2015 | Genier | F21K 9/61 362/558 |
| 2018/0328543 | A1 * | 11/2018 | Bergmann | H01L 25/0753 |
| 2019/0049073 | A1 * | 2/2019 | Eckert | F21K 9/232 |
| 2019/0368667 | A1 * | 12/2019 | On | F21K 9/238 |
| 2020/0212014 | A1 * | 7/2020 | Chen | H01L 25/0753 |

FOREIGN PATENT DOCUMENTS

| | | | |
|---|---|---|---|
| CN | 210662366 | U | 6/2020 |
| EP | 3726935 | A1 | 10/2020 |
| JP | 2001076684 | A | 3/2001 |

(Continued)

OTHER PUBLICATIONS

English translation of Kawamura WO-2021010077-A1 (Year: 2021).*

*Primary Examiner* — Evan P Dzierzynski

(57) ABSTRACT

The present invention relates to an LED filament (10) for providing LED filament light (12), comprising: an elongated carrier (14); and a plurality of light emitting diodes (16) arranged on the elongated carrier, wherein the LED filament is arranged in a coiled-coil configuration.

16 Claims, 6 Drawing Sheets

(56) References Cited

FOREIGN PATENT DOCUMENTS

| | | | | | |
|---|---|---|---|---|---|
| JP | 2002270534 | A | | 9/2002 | |
| JP | 2007087822 | A | | 4/2007 | |
| WO | 2017133770 | A1 | | 8/2017 | |
| WO | 2020151994 | A1 | | 7/2020 | |
| WO | 2020221653 | A1 | | 11/2020 | |
| WO | 2021013656 | A1 | | 1/2021 | |
| WO | WO-2021010077 | A1 | * | 1/2021 | |
| WO | WO-2021018813 | A1 | * | 2/2021 | ............. F21K 9/232 |
| WO | 2021175637 | A1 | | 9/2021 | |

* cited by examiner

LED FILAMENT

CROSS-REFERENCE TO PRIOR APPLICATIONS

This application is the U.S. National Phase application under 35 U.S.C. § 371 of International Application No. PCT/EP2023/053864, filed on Feb. 16, 2023, which claims the benefit of European Patent Application No. 22158407.1, filed on Feb. 24, 2022. These applications are hereby incorporated by reference herein.

FIELD OF THE INVENTION

The present invention relates to an LED (light emitting diode) filament for providing LED filament light. The present invention also relates to a lamp or a luminaire comprising at least one such LED filament. The present invention also relates to a method of manufacturing an LED filament.

BACKGROUND OF THE INVENTION

A trend in lighting is LED filament lamps. An LED filament lamp is an LED lamp which is designed to resemble a traditional incandescent light bulb with a visible filament for aesthetic and light distribution purposes, but with the high efficiency of light-emitting diodes. The LED filament may be arranged in a straight configuration or in a coil configuration. An example of the latter is disclosed in WO2020221653A1.

SUMMARY OF THE INVENTION

It is an object of the present invention to improve the performance and/or appearance of LED filament lamps.

According to a first aspect of the invention, this and other objects are achieved by an LED filament for providing LED filament light, comprising: an elongated carrier; and a plurality of light emitting diodes arranged on the elongated carrier, wherein the LED filament is arranged in a coiled-coil configuration. Especially, the coiled-coil configuration comprises a primary coil having a primary diameter $D_1$, which primary coil is coiled into a secondary coil having a secondary diameter $D_2$, wherein the primary coil comprises a plurality of primary loops and the secondary coil comprises a plurality of secondary loops.

The present LED filament may be referred to as a coiled-coil (or coiled coil) LED filament or coil-in-coil LED filament. A coil is defined as a structure consisting of something wound in a continuous series of loops i.e. comprising a plurality of loops. Hence, a coiled-coil comprises a continuous series of coiled loops.

The coiled-coil configuration of the present LED filament has several advantages. For example, it creates a thicker LED filament while using a thin LED filament. Thicker LED filaments are desired because more light is emitted from the LED filament having a certain length or larger dimensions allow to reduce the intensity/brightness (measured at the surface of the LED filament) preventing/reducing glare. Furthermore, the coiled-coil configuration of the LED filament improved thermal management compared to a thick LED filament providing the same amount of light, because better fluid (such as a gas, e.g. air) flow around the LED filament. Furthermore, the coiled-coil configuration of the LED filament results in an improved decorative appearance.

It can be noted that coiled coil filaments for incandescent light bulb are known, but not coiled-coil LED filaments.

The primary diameter $D_1$ may be in the range from 4 mm to 12 mm. If $D_1$ is <4 mm, the packing of the LED filament becomes too dense to adequately handle heat dissipation. If $D_1$>12 mm, the compactness of the coiled-coil configuration, having the benefit of a high light output in a relatively small space, becomes too small.

The secondary diameter $D_2$ may be in the range from $4D_1$ to $12D_1$. The secondary diameter $D_2$ may be uniform over the length of the LED filament. Alternatively, the secondary diameter $D_2$ may vary over the length of the LED filament. The secondary diameter $D_2$ may for example be small (er) at the ends of the LED filament and be large (r) at the longitudinal centre of the LED filament.

The primary coil may comprise $N_1$ primary loops (or smaller loops, i.e. smaller than the secondary loops) and the secondary coil may comprise $N_2$ secondary loops (or larger loops, i.e. larger than the primary loops), wherein $N_1 \geq 5N_2$, preferably $N_1 \geq 8N_2$, more preferably $N_1 \geq 10N_2$, and most preferably $N_1 \geq 12N_2$. $N_2$ is preferably ≥3, more preferably $N_2 \geq 4$, and most preferably $N_2 \geq 5$. Furthermore, $N_2$ is preferably ≤10, more preferably $N_2 \leq 8$, and most preferably $N_2 \leq 7$.

The secondary coil may have a secondary pitch $P_2$ in the range from $2D_1$ to $10D_1$.

The plurality of light emitting diodes may comprises blue and/or UV light emitting diodes. The plurality of light emitting diodes may be covered by an elongated encapsulant. The elongated encapsulant may comprise luminescent material configured to at least partly convert LED light emitted by the blue and/or UV light emitting diodes into converted light. The elongated encapsulant may be flexible. The elongated encapsulant may be a polymer material, such as for example a silicone. The luminescent material may for example be a (yellow and/or red) phosphor.

The plurality of light emitting diodes may comprise a first set of first light emitting diodes and a second set of second light emitting diodes, wherein the first set is individually controllable (by a controller) in relation to the second set. The sets may be arranged for emitting LED light e.g. of different colors or spectrums. In this way, the coil-coiled LED filament may be tunable, for example with respect to color and/or color temperature.

The LED filament may further comprise a ductile element arranged along at least a major (>50%, e.g. >80%) portion of the length of the elongated carrier for allowing the LED filament to be shaped. "Ductile" means capable of being shaped and is dimensionally stable i.e. when deformed from a first shape into a second shape it remains in the second shape. The ductile element may for example be a (thin) metal wire or strip e.g. made of aluminium or copper. The thickness of the ductile element is preferably in the range of 1-5 mm. The ductile element can be arranged at a non-light blocking location; the ductile element can for example be arranged on a second major surface of the elongated carrier, whereas the plurality of light emitting diodes are arranged on an opposite first major surface of the elongated carrier. The ductile element can be light reflecting, so that at least part of the LED filament light may be reflected by the ductile element. The ductile element can be substantially non-light-absorbing (e.g. made of metal or having a reflective coating), so that it does not deteriorate the light output performance of the LED filament. The ductile element can be non-visible; the ductile element may for example be integrated in the elongated carrier or be covered by the aforementioned elongated encapsulant.

The ductile element may be configured to allow the LED filament to be shaped from a basic shape into a first coiled shape (corresponding to said primary coil) and/or a second coiled shape (corresponding to said secondary coil), wherein the first coiled shape and the second coiled shape are dimensionally stable. The basic shape will typically be flat/straight. "Dimensionally stable" may here mean here that the shapes will be maintained after the force(s) used to form them have been removed.

Instead of, or in addition to, using the ductile element, at least the shape of the primary coil may be fixed by using a glue or a thermoplastic polymer which can be deformed by heating the LED filament above the glass-transition temperature (Tg) and/or melting point (Tm) of said thermoplastic material and cooling it down to room temperature. For the latter technology, a polymer with a high Tg and/or Tm should be chosen, because when the LED filament is lit the temperature of the lit LED filament should be below the Tg and/or Tm, preferably at least a difference of 30° C.

The primary coil may be formed around and mounted to a rod, wherein the rod has one or more of the following properties: (i) (highly) reflective to reflect at least part of the LED filament light; (ii) light diffusive to diffuse at least part of the LED filament light; (iii) light converting to convert at least part of the LED filament light; (iv) transmissive to act as a lightguide guiding at least part of the LED filament light; and (v) thermal conductive to act as a heatsink. In this way, the rod can facilitate manufacturing of the LED filament as well as beneficially affect the optical and/or thermal performance of the LED filament. The rod is preferably shapable.

The present coiled-coil LED filament will typically be arranged in a (substantially) straight configuration. Alternatively, the LED filament may be arranged in a triple coiled coil configuration, for even higher compact light output and/or to simulate an appearance of a glowing 3D filled sphere light emitting body (alike the sun).

According to a second aspect of the invention, there is provided a (n LED) lamp or a luminaire comprising at least one (coiled-coil) LED filament according to the first aspect arranged behind a light exit window. The lamp may further comprise: an envelope at least partly forming said light exit window and at least partly enclosing the at least one coiled-coil LED filament; and a cap for electrically and mechanically connecting the lamp to a socket. The lamp may for example be a 'giant' bulb (dimension ≥20 cm). The luminaire may be mountable in, on, or from a ceiling, for example.

The at least one coiled-coil LED filament may be a plurality of coiled-coil LED filaments. The plurality of coiled-coil LED filaments may for example comprises at least two coiled-coil LED filaments entangled.

According to a third aspect of the invention, there is provided method of manufacturing an LED filament, comprising: providing a flexible carrier, wherein a plurality of light emitting diodes are arranged on the flexible carrier; coiling the provided flexible carrier around a rod to provide an LED filament having a primary coil with a primary diameter $D_1$; and coiling the LED filament having the primary coil into a secondary coil having a secondary diameter $D_2$ to provide an LED filament having a coiled-coil configuration. This aspect may exhibit the same or similar features and technical effects as the first aspect, and vice versa.

It is noted that the invention relates to all possible combinations of features recited in the claims.

BRIEF DESCRIPTION OF THE DRAWINGS

These and other aspects of the present invention will now be described in more detail, with reference to the appended drawings showing embodiments of the invention.

As illustrated in the figures, the sizes of layers and regions may be exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
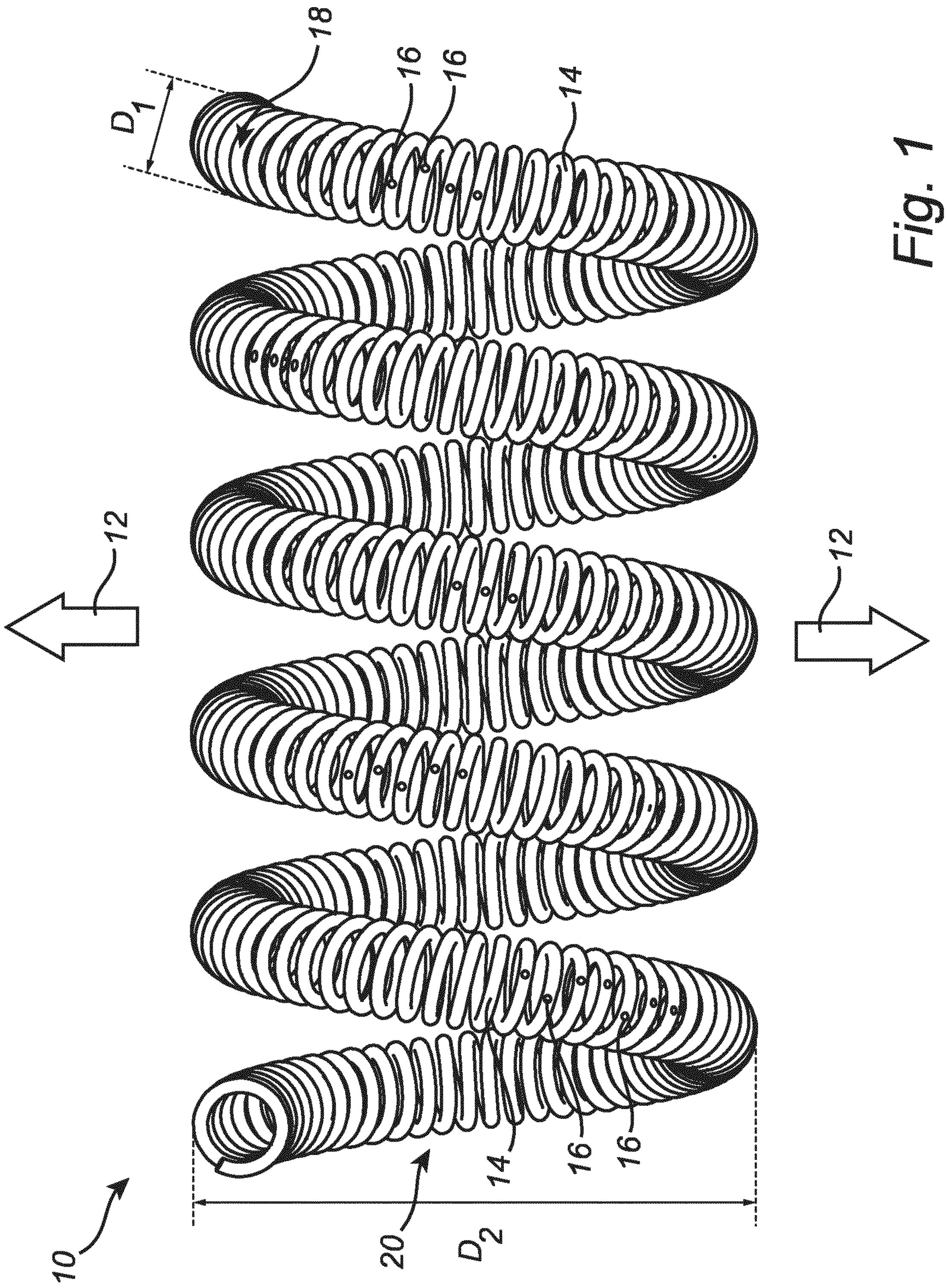
FIG. 1 schematically illustrates an LED filament according to an embodiment of the present invention.

FIG. 1 illustrates an LED filament 10 for providing LED filament light 12 according to an embodiment of the present invention.

Figure 3A:
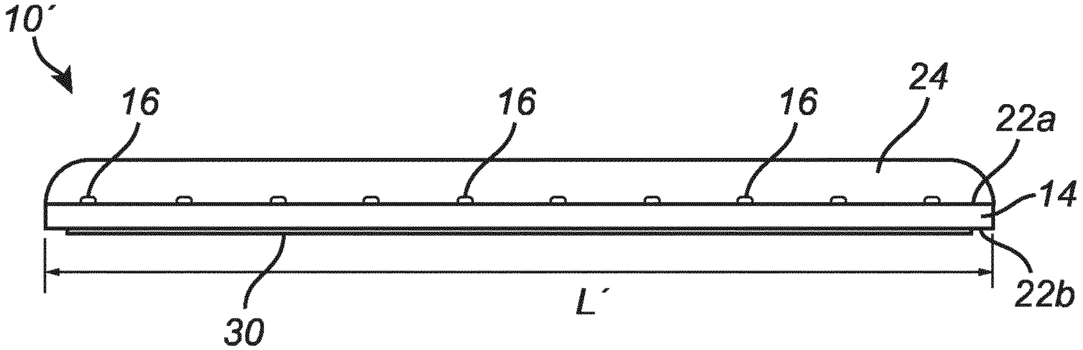
FIGS. 3*a-d* illustrate the method of manufacturing an LED filament and/or various details of the LED filament.
Figure 3C:
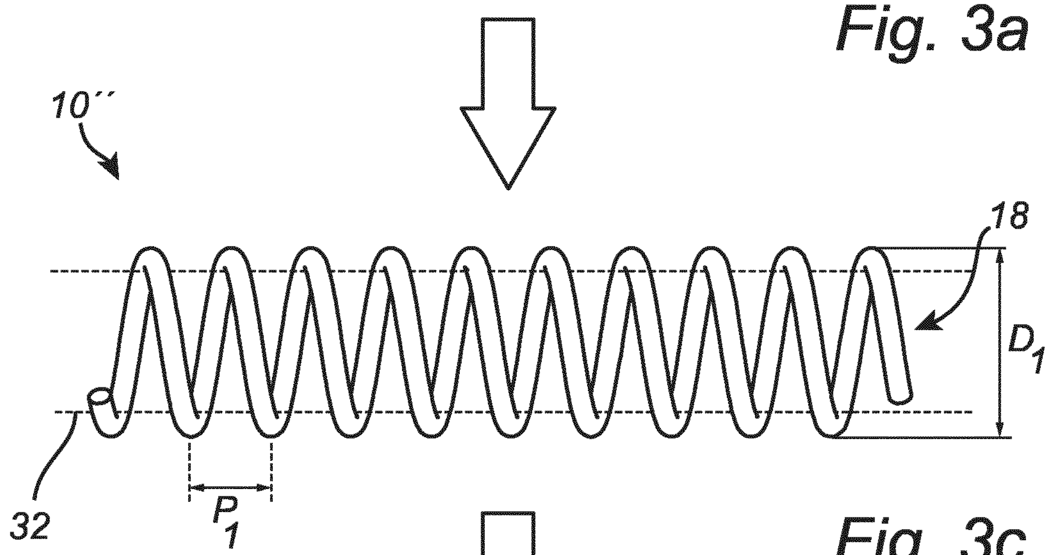
Figure 3D:
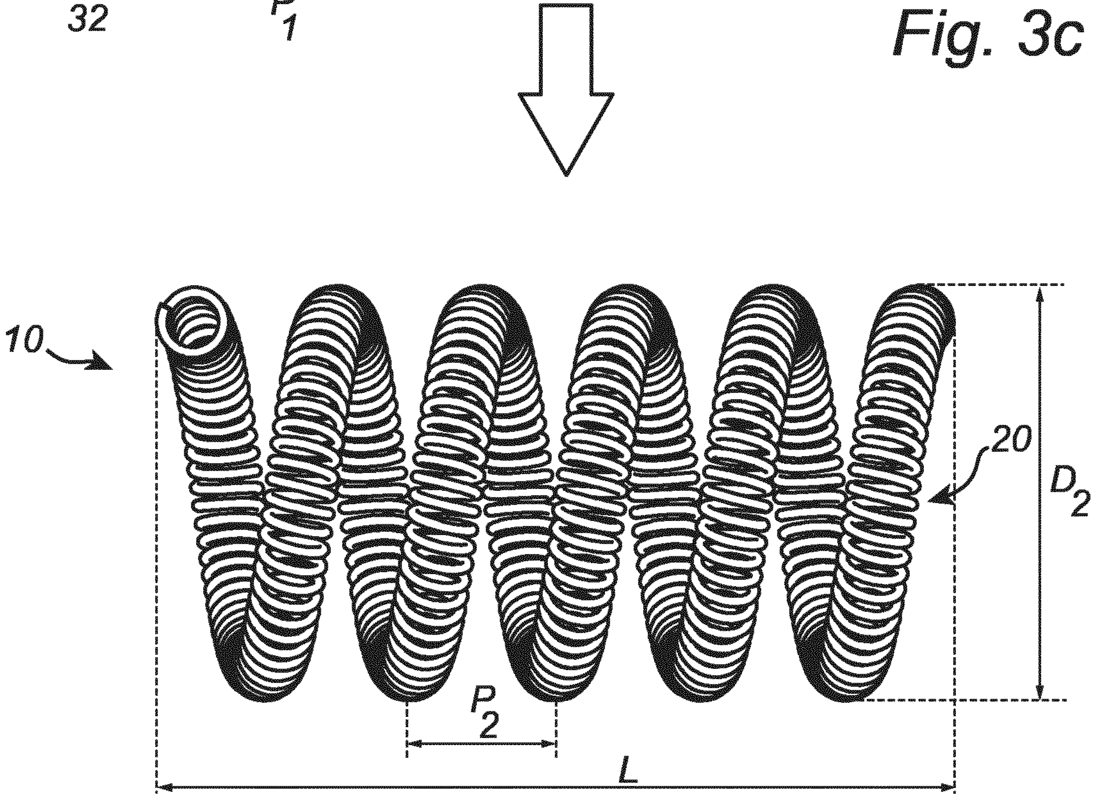
Figure 3B:
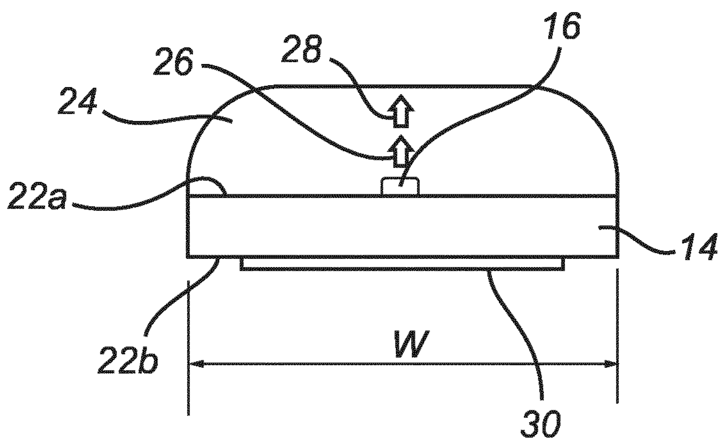

The LED filament 10 comprises an elongated flexile carrier 14, and plurality of LEDs (light emitting diodes) 16 arranged on the elongated carrier, see also FIGS. 3*a-b*. In FIG. 1, only some of the LEDs 16 are illustrated for brevity.

According to the present invention, the LED filament 10 is arranged in a coiled-coil configuration, as shown for example in FIG. 1. Specifically, the coiled-coil configuration comprises a primary coil 18 having a primary (outer) diameter $D_1$, see also FIG. 3*c*. Furthermore, the primary coil 18 is coiled into a secondary coil 20 having a secondary diameter $D_2$. The secondary coil 20 comprises $N_2$ secondary loops. In FIG. 1, $N_2$ is 5. The coiled-coil LED filament 10 will typically be arranged in a straight configuration, as also shown in FIG. 1.

Figure 2:
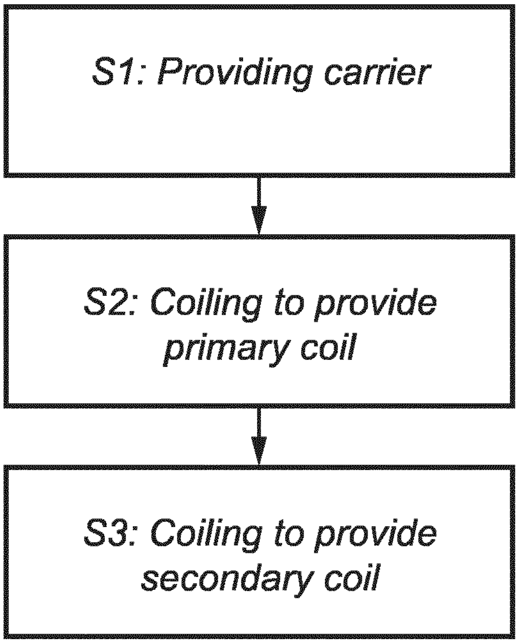
FIG. 2 is a flowchart of a method of manufacturing an LED filament according to an aspect of the present invention.

Turning to FIG. 2, the LED filament 10 may be manufactured as follows. At S1, the elongated flexile carrier 14 is provided, wherein the plurality of LEDs 16 are arranged on the flexible carrier 14, see also FIGS. 3*a-b*. The LEDs 16 may be arranged in at least one linear array. Preferably, the elongated flexile carrier 14 has a length L' and a width W, wherein L'>20 W, preferably L'>40 W, more preferably L'>60 W, and most preferably L'>80 W. The width W of the carrier 14 of the LED filament 10 may be in a range from 0.5 to 5 mm. The LEDs 16 may be (evenly) distributed throughout the complete length' L of the carrier 14. The carrier 14 may comprises a first major surface 22*a* and an opposite second major surface 22*b*, and the LEDs 16 may be arranged on at least one of these surfaces. In FIG. 3*a*, the LEDs 16 are arranged on the first major surface 22*a*. The flexible carrier 14 may for example be made of a polymer or metal, e.g. a film or foil. The carrier 14 may be a flexible PCB (printed circuit board).

The LEDs 16 may for example be blue and/or UV LEDs, although other LEDs could be used instead, such as RGB LEDs. Furthermore, the LEDs 16 and the first major surface 22*a* may be covered by an elongated flexible encapsulant 24. The encapsulant 24 may for example be a silicone material.

The encapsulant 24 may comprise luminescent material configured to at least partly convert LED light 26 emitted by the blue and/or UV LEDs 16 into converted light 28. The LED light 26 and the converted light 28 may form the LED filament light 12. The luminescent material may for example be a phosphor, such as an inorganic phosphor and/or quantum dots or rods.

Furthermore, the LEDs 16 may comprise a first set of first LEDs and a second set of second LEDs, wherein the first set is individually controllable by a controller (not shown) in relation to the second set. In this way, the LED filament 10 may be tunable, for example with respect to color and/or color temperature.

The carrier 14 may be provided with a ductile (shapable) element 30. The ductile element 30 allows the LED filament 10 to be shaped and also maintain the new shape. The ductile element 30 may be arranged along at least a major portion of the length L' of the carrier 14, preferably along (substantially) the complete length L' of the carrier 14. The ductile element 30 can for example be arranged on the second major surface 22*b* of the carrier 14, as shown in FIGS. 3*a-b*. In this way, the ductile element 30 will not block LED light emitted by the LEDs 16 arranged on the opposite first major surface 22*a*. Alternatively, the ductile element 30 could be integrated in the carrier 14, i.e. provided inside the carrier 14. In this way, apart from not blocking LED light emitted by the LEDs 16, the ductile element 30 may also be invisible for a user/viewer. In another alternative, the ductile element 30 could be covered by the encapsulant 24 to become non-visible. The ductile element 30 may for example be a thin* metal wire or strip e.g. made of aluminium or copper. As such, the (metal) ductile element 30 may be light reflecting and/or substantially non-light-absorbing. *The thickness of the ductile element 30 is preferably in the range of 1-5 mm.

In step S1, the unfinished LED filament 10' has a basic shape, typically flat/straight, as shown in FIG. 3*a*.

At S2, the unfinished LED filament 10' including the carrier 14 is coiled, preferably around a rod 32, to provide unfinished LED filament 10" having a primary coil 18 with primary diameter $D_1$. In case the LEDs 16 are arranged only on the first major surface 22*a*, the carrier 14 may be coiled such that the first major surface 22*a* with the LEDs 16 is on the outside of the primary coil 18. An advantage of this is improved LED filament light 12, because the light is emitted in a direction away from the LED filament 10 and is thus less absorbed. Furthermore, such configuration is more reliable because it is less likely that electrical connections are broken. The primary coil 18 may also be mounted to the rod 32. In step S2, the ductile element 30 allows the LED filament 10' to be shaped from the basic shape (FIG. 3*a*) into a first coiled shape corresponding to said primary coil 18, which first coiled shape is dimensionally stable.

The rod 32 may be at least one of: (i) reflective, (ii) light diffusive, (iii) light converting, (iv) transmissive, (v) thermally conductive, and (vi) shapable. The rod 32 may be (i) highly reflective, wherein preferably the reflectance R is >80%. Regarding (ii), the rod 32 may have a reflectance R>80%. Regarding (iii), the rod 32 may be configured to convert at least 10% of the LED filament light. Regarding (iv), the rod 32 is preferably >80% transmissive, more preferably transparent. Regarding (v), the rod preferably has a thermal conductivity >100 W/mK, more preferably >200 W/mK, and most preferably >250 W/mK.

The rod 32 may be included in the final/finished LED filament 10 and as such be arranged in the LED filament lamp 100 or a luminaire, but could alternatively be removed after step S2 and hence not be included in the final/finished LED filament 10.

The primary diameter $D_1$ may be in the range from 4 mm to 12 mm. Furthermore, the primary coil 18 may comprise $N_1$ primary loops. $N_1$ may be $\geq 5N_2$, preferably $N_1 \geq 8N_2$, more preferably $N_1 \geq 10N_2$, and most preferably $N_1 \geq 12N_2$. So for $N_2=5$ as in FIG. 1, the primary coil 18 could comprise more than 60 primary loops.

At S3, the unfinished LED filament 10" (with or without rod 32) is coiled into a secondary coil 20 having secondary diameter $D_2$ to provide the (final/finished) LED filament 10 having a coiled-coil configuration. In other words, the coil shaped LED filament 10' obtained in step S2 is subsequently coiled e.g. in a spiral/helix shape to obtain the coiled-coil LED filament 10. In step S3, the ductile element 30 allows the LED filament 10" to be shaped into a second coiled shape corresponding to said secondary coil 20, wherein the second coiled shape is dimensionally stable.

The secondary diameter $D_2$ may be in the range from $4D_1$ to $12D_1$. Hence, for $D_1=4$ mm, the secondary diameter $D_2$ may be as small as 16 mm. And for $D_1=12$ mm, the secondary diameter $D_2$ may be as large as 144 mm. The secondary diameter $D_2$ will typically be uniform over the length L of the LED filament 10, as shown in FIG. 3*d*.

$N_2$ (i.e. the number of secondary loops of the secondary coil 20) is preferably ≥3, more preferably $N_2 \geq 4$, and most preferably $N_2 \geq 5$. Furthermore, $N_2$ is preferably ≤10, more preferably $N_2 \leq 8$, and most preferably $N_2 \leq 7$.

Furthermore, the secondary pitch $P_2$ of the secondary coil 20 may be in the range from $2D_1$ to $10D_1$. Hence, for $D_1=4$ mm, the secondary pitch $P_2$ may be as small as 8 mm. And for $D_1=12$ mm, the pitch P may be as large as 120 mm.

In embodiments, the primary pitch $P_1$ of the primary coil 18 (see FIG. 3*c*) may be much smaller than the secondary pitch $P_2$. Preferably $P_2$ is at least 8 times $P_1$, more preferably $P_2$ is at least 10 times $P_1$, and most preferably $P_2$ is at least 12 times $P_1$.

In embodiments, the primary pitch $P_1$ may be much smaller than the secondary pitch $P_2$ but not too long. Preferably $P_2$ is at the most 30 times $P_1$.

The length L of the LED filament 10 may be at least 20 cm, preferably at least 40 cm, more preferably at least 60 cm, most preferably at least 80 cm.

Figure 4:
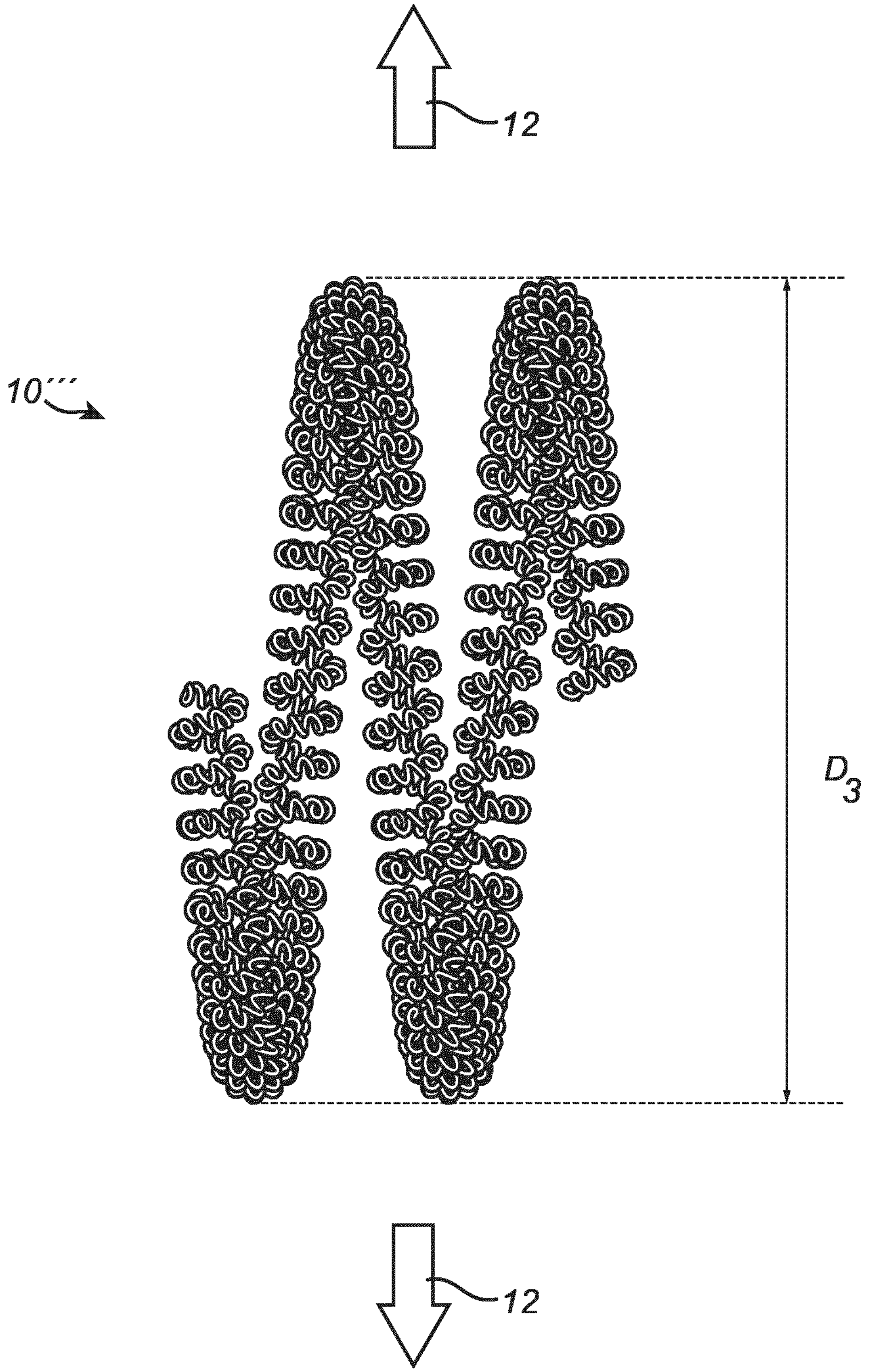
FIG. 4 is a partial view of an LED filament according to another embodiment of the present invention.

FIG. 4 illustrates an LED filament 10"" for providing LED filament light 12 according to another embodiment of the invention. The LED filament 10"" comprises an elongated carrier (14) and LEDs (16) arranged on the elongated carrier, wherein the LED filament 10'" is arranged in a triple coiled coil configuration. That is, the coiled-coil LED filament 10 may be coiled once more, into a tertiary coil. The tertiary coil may have a tertiary (outer) diameter $D_3$. For this embodiment, the method of FIG. 2 could include an additional step (S4) of coiling to provide a tertiary coil.

Figure 5:
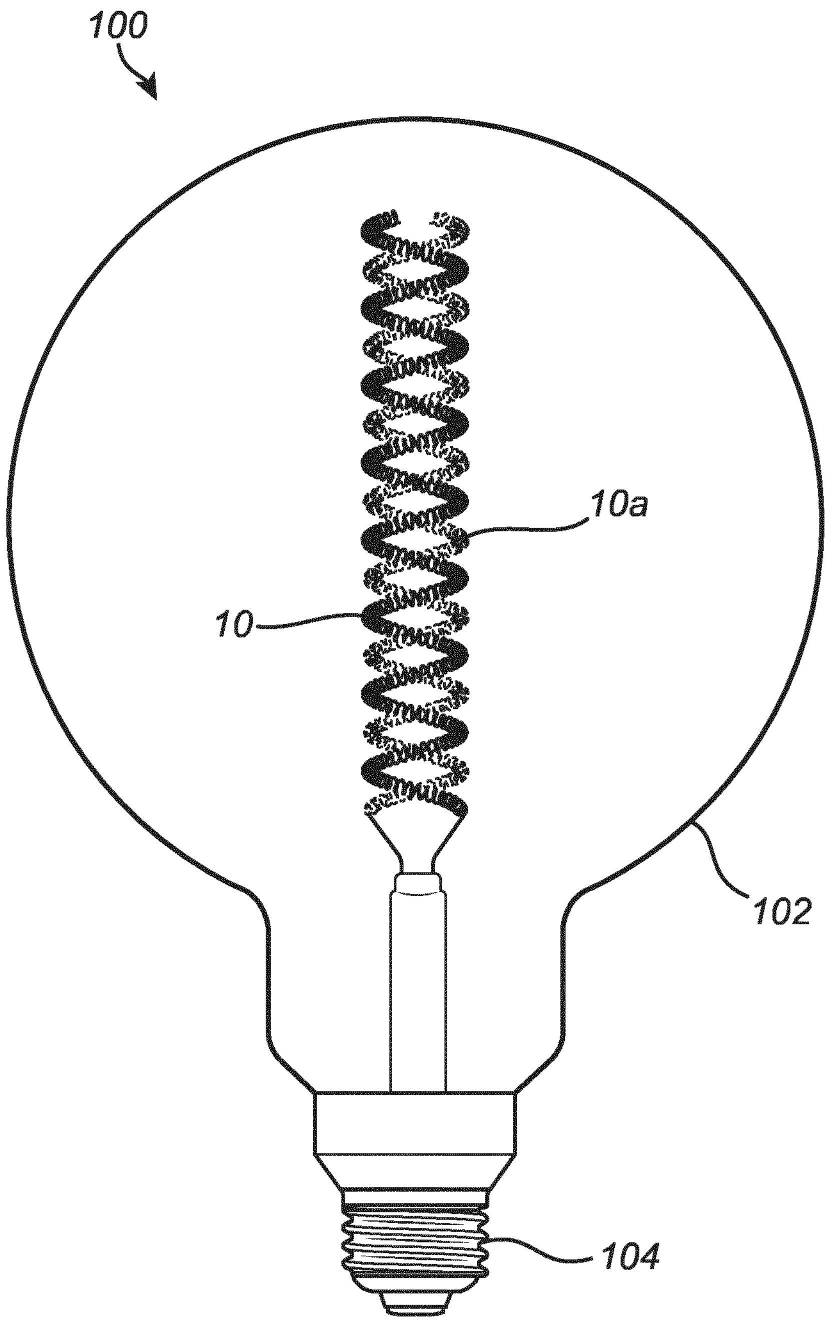
FIG. 5 is a side view of an LED lamp according to an aspect of the present invention.

FIG. 5 illustrates an LED lamp 100 comprising the coiled-coil LED filament 10. The LED lamp 100 further comprises an envelope 102 enclosing the coiled-coil LED filament 10, and a cap 104 for electrically and mechanically connecting the LED lamp 100 to an external socket (not shown). The LED lamp 100 may be a retrofit bulb. The LED lamp 100 may be a giant bulb, wherein the diameter or height or width of the envelope 102 is ≥20 cm.

The envelope 102 forms a light exit window of the LED lamp 100. The envelope 102 may for example be transparent. The envelope 102 here has a spherical or globe (G) shape, but other shapes are possible as well, such as general (A) or tubular (T).

The coiled-coil LED filament 10 is in FIG. 5 arranged in a straight and vertical configuration, but it could alternatively be arranged in a horizontal configuration (i.e. perpendicular to the longitudinal axis of the lamp 100), for example. Furthermore, a second coiled-coil LED filament 10_a_ could be entangled with the (first) LED filament 10.

The person skilled in the art realizes that the present invention by no means is limited to the preferred embodiments described above. On the contrary, many modifications and variations are possible within the scope of the appended claims. For example, the coiled-coil LED filament 10 could be included in a luminaire.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. An LED filament for providing LED filament light, comprising:

an elongated carrier having a first major surface and an opposite second major surface;

a plurality of light emitting diodes arranged on the first major surface of the elongated carrier; and a ductile element arranged on the second major surface of the elongated carrier and along at least a major portion of a length of the elongated carrier, the ductile element being configured to allow the LED filament to be shaped from a basic shape into a first coiled shape corresponding to the primary coil and a second coiled shape corresponding to the secondary coil, the first coiled shape and the second coiled shape being dimensionally stable, wherein the LED filament is arranged in a coiled-coil configuration, the coiled-coil configuration comprises a primary coil having a primary diameter $D_1$, which primary coil is coiled into a secondary coil having a secondary diameter $D_2$, and wherein the plurality of light emitting diodes comprises blue and/or UV light emitting diodes, the plurality of light emitting diodes are covered by an elongated encapsulant, and the elongated encapsulant comprises luminescent material configured to at least partly convert LED light emitted by the blue and/or UV light emitting diodes into converted light.

2. The LED filament according to claim 1, wherein the primary diameter $D_1$ is in the range from 4 mm to 12 mm.

3. The LED filament according to claim 1, wherein the secondary diameter $D_2$ is in the range from $4 \cdot D_1$ to $12 \cdot D_1$.

4. The LED filament according to claim 1, wherein the primary coil comprises $N_1$ primary loops and the secondary coil comprises $N_2$ secondary loops, and wherein $N_1 \geq 5 \cdot N_2$.

5. The LED filament according to claim 1, wherein the secondary coil has a secondary pitch $P_2$ in the range from $2 \cdot D_1$ to $10 \cdot D_1$.

6. The LED filament according to claim 1, wherein the plurality of light emitting diodes comprises a first set of first light emitting diodes and a second set of second light emitting diodes, wherein the first set is individually controllable in relation to the second set.

7. The LED filament according to claim 1, wherein the primary coil is formed around and mounted to a rod, and wherein the rod has one or more of the following properties:

(i) reflective to reflect at least part of the LED filament light;

(ii) light diffusive to diffuse at least part of the LED filament light;

(iii) light converting to convert at least part of the LED filament light;

(iv) transmissive to act as a lightguide guiding at least part of the LED filament light; and (v) thermally conductive to act as a heatsink.

8. The LED filament according to claim 1, wherein the LED filament is arranged in a triple coiled coil configuration.

9. A lamp or a luminaire comprising at least one coiled-coil LED filament according to claim 1 arranged behind a light exit window.

10. A lamp or a luminaire according to claim 9, wherein the at least one coiled-coil LED filament is a plurality of coiled-coil LED filaments.

11. A lamp or a luminaire according to claim 10, wherein the plurality of coiled-coil LED filaments comprises at least two coiled-coil LED filaments entangled.

12. The LED filament according to claim 1, wherein the ductile element comprises a metal wire or a metal strip.

13. The LED filament according to claim 1, wherein the elongated carrier is coiled into the primary coil such that the first major surface with the plurality of light emitting diodes is arranged on an outside of the primary coil.

14. The LED filament according to claim 1, wherein at least a shape of the primary coil is fixed by a glue or a thermoplastic polymer.

15. The LED filament according to claim 1, wherein the secondary diameter $D_2$ varies over a length of the LED filament such that $D_2$ is smaller at ends of the LED filament than at a longitudinal center of the LED filament.

16. A method of manufacturing an LED filament, comprising:

providing a flexible carrier having a first major surface and an opposite second major surface, a ductile element being arranged on the second major surface of the flexible carrier and along at least a major portion of a length of the flexible carrier, a plurality of light emitting diodes being arranged on the first major surface of the flexible carrier, the plurality of light emitting diodes having blue and/or UV light emitting diodes, the plurality of light emitting diodes being covered by an elongated encapsulant, and the elongated encapsulant having luminescent material configured to at least partly convert LED light emitted by the blue and/or UV light emitting diodes into converted light;

coiling the provided flexible carrier around a rod to provide an LED filament having a primary coil with a primary diameter $D_1$, the ductile element shaping the LED filament into a first coiled shape corresponding to the primary coil that is dimensionally stable; and coiling the LED filament having the primary coil into a secondary coil having a secondary diameter $D_2$ to provide an LED filament having a coiled-coil configuration, the ductile element shaping the LED filament into a second coiled shape corresponding to the secondary coil that is dimensionally stable.

* * * * *